United States Patent
Huang et al.

(10) Patent No.: US 6,767,101 B2
(45) Date of Patent: Jul. 27, 2004

(54) FILM SCANNING DEVICE FOR RECEIVING EITHER STRIP FILM OR A SLIDE MOUNT UTILIZING A SINGLE PHOTOGRAPHIC SENSOR

(76) Inventors: Pony Huang, 10F-1, No. 81, Hsin Tai Wu Rd., Sec. 1, Hsi Chih, Taipei Hsien (TW); Kevin Tseng, 10F-1, No. 81, Hsin Tai Wu Rd., Sec. 1, Hsi Chih, Taipei Hsien (TW)

( * ) Notice: Subject to any disclaimer, the term of this patent is extended or adjusted under 35 U.S.C. 154(b) by 0 days.

(21) Appl. No.: 09/938,837

(22) Filed: Aug. 27, 2001

(65) Prior Publication Data

US 2002/0127018 A1 Sep. 12, 2002

(30) Foreign Application Priority Data

Aug. 28, 2000 (TW) .......................................... 89117417 A
Aug. 28, 2000 (TW) .......................................... 89117418 A
Aug. 28, 2000 (TW) .......................................... 89117419 A
Aug. 28, 2000 (TW) .......................................... 89117420 A
Aug. 28, 2000 (TW) .......................................... 89117421 A

(51) Int. Cl.[7] .................. G03B 23/00; G03B 27/62; G03B 21/00; G03B 1/48; H04N 9/47
(52) U.S. Cl. .................. 353/68; 353/119; 353/26; 353/27; 353/95; 353/120; 353/122; 396/430; 348/96; 348/97; 355/75
(58) Field of Search ............................ 353/119, 26, 27, 353/68, 95, 120, 122; 396/430; 348/96, 97; 355/75

(56) References Cited

U.S. PATENT DOCUMENTS

| 4,858,003 | A | * | 8/1989 | Wirt et al. .................. 358/102 |
| 5,757,430 | A | * | 5/1998 | Maeda et al. ............... 348/373 |
| 5,912,724 | A | * | 6/1999 | Sakaguchi .................... 355/35 |
| 5,933,222 | A | * | 8/1999 | Hoshino et al. .............. 355/75 |
| 6,304,344 | B1 | * | 10/2001 | Brandestini et al. ........ 358/487 |

* cited by examiner

Primary Examiner—Russell Adams
Assistant Examiner—Melissa Koval
(74) Attorney, Agent, or Firm—Nath & Associates PLLC; Harold L. Novick; Marvin C. Berkowitz

(57) ABSTRACT

A film scanning device using the same CCD light sensor for pictures of strip film and for a slide mount also comprises a body having a strip film transport path disposed there through. The transport path has a first opening in the body for inserting a developed strip film, a second opening in the body through which the developed strip film exits the body, and a third opening for inserting and pulling out a slide mount juxtaposed vertically relative to the strip film transport path.

3 Claims, 4 Drawing Sheets

FILM SCANNING DEVICE FOR RECEIVING EITHER STRIP FILM OR A SLIDE MOUNT UTILIZING A SINGLE PHOTOGRAPHIC SENSOR

BACKGROUND OF THE INVENTION

1. Technical Field of the Invention

The present invention relates to a film scanning device which uses the same lighting device for strip film and slide mount.

2. Description of Related Art

Prior Technique

A scanner is used to scan pictures of a strip film on which a light is projected to read the film.

The projected light from a photo picture of the strip film is converted into an image by an image lens. This image is read by appropriate procedures and the picture data (image data signal) is sent to a picture operating device.

Such a detail scanning device is disclosed in publication Number 224688 which was published in the Kokai Patent gazette in 1999.

The advantages of the prior invention are: the possibility to use both a film strip and a slide mount; the fact that the pictures are taken by the same CCD light sensor; and the film actuating mechanism. Slide mounts can be moved by a mount carrier carrying a plurality of slide mounts. Slide mounts and film strips are actuated by the same roller through the up and down motion of a movable bar.

However, the complicate operation of this prior invention implies that a user must be very careful with the components disclosed in the aforesaid prior invention and in particular with the slide mounts that must be filled into a mount carrier when the pictures of slide mounts are scanned.

OBJECT OF THE INVENTION

In view of the foregoing and other known disadvantages of the prior art, an object of the present invention is to find a solution to resolve said disadvantages which include a complicate operation needed to make possible the use of the same CCD light sensor for both strip film and slide mount.

TECHNIQUE USED TO ACHIEVE THE PURPOSES

The features of the present invention are realized in a film scanning device that includes: a first opening located at the body for inserting the developed strip film; a second opening located at the body which is an exit for the strip film which was inserted into the first opening; a third opening located in front of the body which is for inserting and pulling out the slide mount in a direction perpendicular to the direction in which the strip film moves; an actuator located at each side of the body for actuating a mechanism that moves the strip film along a path on which the strip film is carried; a photographic sensor which takes pictures of the strip film that is inserted in the first opening and/or the slide mount that is inserted in the third opening; and a projecting light which is used to project the pictures from the photographic sensor.

Another feature of the present invention is realized in a film scanning device with at least one location having a transit roller to transit the aforesaid strip film in an actuating mechanism, said mechanism being located at a front end and a back end along a moving direction of the strip film when the aforesaid photographic sensor is scanning the strip film.

Another feature of the present invention is realized in a scanning device with at least one location having a transit roller to transit the aforesaid strip film in an actuating mechanism, said mechanism being located at a front end and a back end along a moving direction of the strip film when the aforesaid photographic sensor is scanning the strip film, and wherein all link mechanisms are actuated by a same timing belt or a gear moving with a given period.

The carrying roller is actuated independently. A carrying amount variation could cause the film to not move smoothly; however, the two carrying rollers of the present invention are mechanically linked to each other, thereby avoiding a variation of carrying amount of the film, and therefore the film is moved in a smooth way.

The whole body of the present invention is small thereby improving the mobility of the device. The layout of the carrying mechanism of the strip film being small, mobility is increased. The carrying mechanism of the strip film is located on both sides of the corresponding carrying path of the strip film. A carrying actuator, a linking mechanism having a carrying mechanism, and a transmission mechanism are all located in two rear sides and two front sides of the carrying path and do not need any mechanism for it. Therefore, there is room nearby in front of the device, the depth of insertion of the slide mount is the smallest possible, and although fully functional, the whole body of the device is kept small.

The term strip film is used in the present application with the same meaning as it is usually used. Usually, strip film is positive film, however, negative film can also be used in the present invention as described in the examples. Strip film is used in the hereinbelow examples of the present invention.

DETAILED DESCRIPTION OF THE PREFERRED EMBODIMENTS

Figure 1:
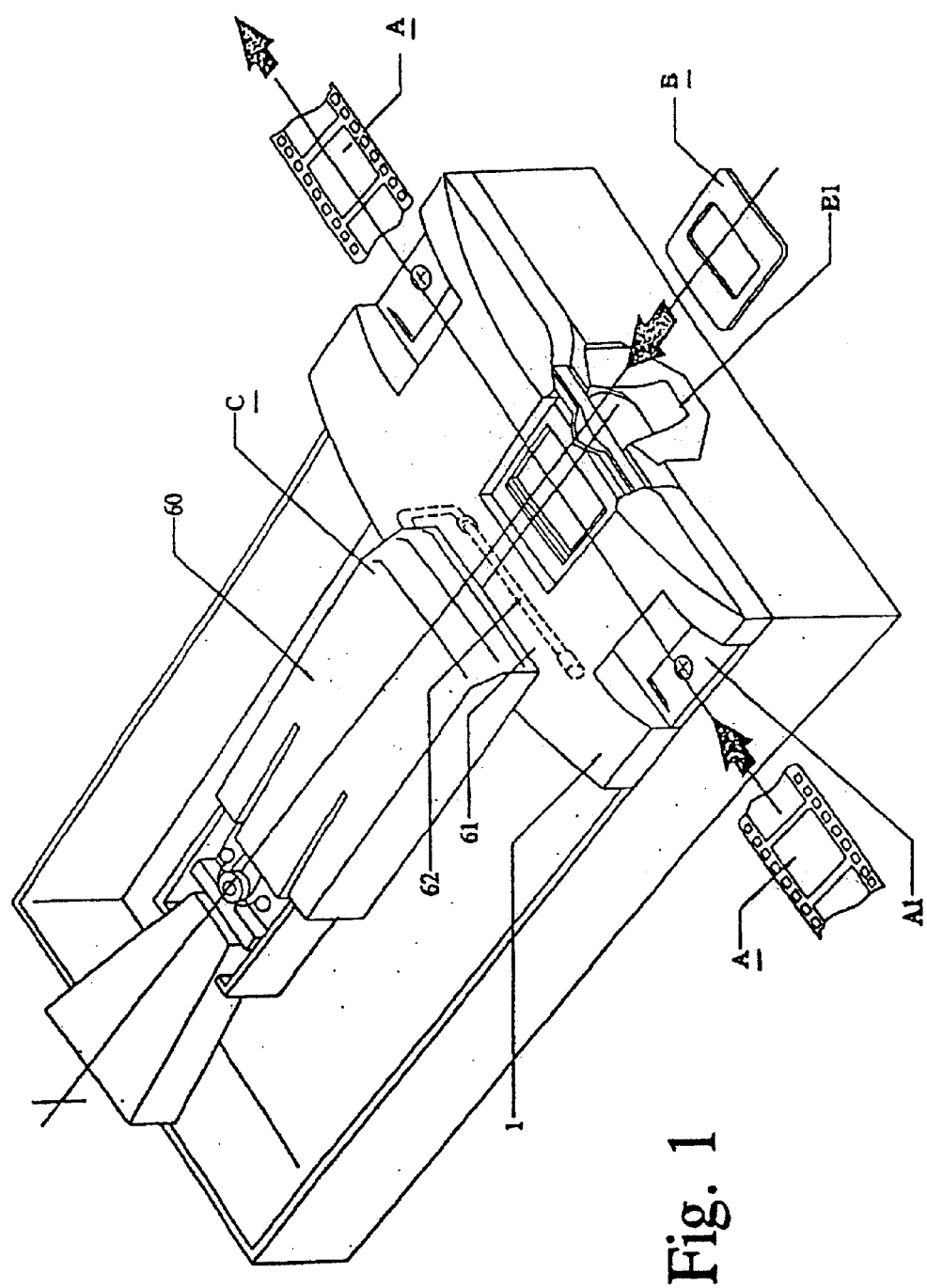
FIG. 1 is an elevational view of a scanning device according to an embodiment of the present invention.

A first example of the whole device according to the present invention is shown in the drawings. Positive and negative films are included in strip film (A), a slide mount is shown in mount (B), both of them are readable by the same light device. It is very easy to distinguish the carrying mechanism (A1) which includes a carrying actuator of strip film (A), an inserting system (B1) of slide mount (B), and a scanning system (C).

The carrying actuator of carrying mechanism (A1) has a body which is composed of three layers: a cover (1) which is an always horizontal plate, a press plate (2), and a supporter (3).

In two sides of the cover (1) the strip film (A) is moved through the first opening (11) in its long side direction, the first light path (4) which will be described in more detail hereinbelow transits through a light source and is formed around the central portion of the second opening (12).

The length of light path (4) is equal to the sum of strip film (A) and slide mount (B). The effective width of strip film (A) is the difference between its total width and the perforation width, and is about the same as the effective width of slide mount (B) which is the difference between its total width and the bar width.

Furthermore, the length of cover (1) is from the entrance of the first opening (11) to the second opening, and it is desirable that this length be at least equal to 8 frames of the strip film (A) However, it is not restricted at this length, provided that any proper length is available.

Press plate (2) is located beneath and adapted to the cover (1), it is made of thin resin plate, and the above-mentioned first light path (4) is located at its central portion in accordance with the size of the second light path (21).

One each side of the second light path (21) there is a pair of shaft bearings or mounts (22) positioned in the transverse direction of press plate (2). In order to support the two sides of shaft (23), the length of said shaft bearings (22) is about the width of press plate (2).

Idling rollers (24) are embedded at each end of shaft (23), and a light lug is located downward and beneath the press plate (2).

As strip film (A) is carried from the first opening (11) of the cover (1) to inside the press plate (2), the idling rollers (24) are in contact with the upper part of the strip film (A) One end of (25) in the drawings is pressed downward to the middle part of the shaft (23), and the other end is fixed by a plate-form-spring to the proper position of the press plate (2).

Four fossas (26) are disposed peripherally around second light path (21) on the surface of press plate (2). Lugs (15) at the bottom of the cover (1) engage in each corresponding fossas (26) thereby maintaining a constant position of cover (1) relative to press plate (2) in every direction.

The bottom of the press plate (2) is in contact with, and fixed to supporting plate (3), and the central portion of supporting plate (3) coincides with the first light path (4) of cover (1) and the third light path (31) which has a size in accordance with the second light path (21).

In the same manner as the shaft bearings (22) of the press plate (2), there are located in the bottom of supporting plate (3) which contains the third light path (31) recesses (32) which support the actuating rollers (34) that are attached to shafts (33) on each side of the third light path (31). Therefore, the idling rollers (24) of the press plate (2) correspond vertically to the rollers (34).

Idling rollers (24) and actuating rollers (34) are situated in an upper and a lower position and both act as carrying rollers of strip film (A) When the photographic sensor is scanning a picture from strip film (A), there is always at least one pair of rollers located either at the front or the rear of strip film (A) moving strip film (A) in the carrying direction of the aperture.

The rear part of a pair of shafts (33) is slightly lugged outward from the rear part of the supporting plate (3). A carrying part (35) corresponds to each lug, and said carrying parts are connected to a timing belt (36). Consequently, the corresponding pair of carrying rollers are mechanically linked to each other.

The rear part of a pair of shafts (33) is slightly lugged outward from the rear part of the supporting plate (3). A carrying part (35) corresponds to each lug, and said carrying parts are connected to a timing belt (36). One side of the pair of shafts (33) is connected to a motor (37) which is positioned at a reduced gear and located at a proper location on supporting plate (3). Accordingly, a rotating force is transmitted to the actuating roller (34) through the timing belt (36) and shaft (33). This is the carrying mechanism (G). Motor (37) for transmitting an actuating force to carrying mechanism (G) through the carrying path of strip film (A) is located at a rear side of main body (F).

Springs (38) are coil springs which are located at the four corners of the supporting plate (3). The springs (38) are fixed by means that are not shown in the drawings.

Parts (39), located on each end of supporting plate (3), comprise tab holes located at their front and back sides. Inside each end of cover (1) in this example, a pair of lugs (13) hang downward and lugged from the inside of second opening (12) and the first opening (11), engaging in tab holes (39) maintaining a good relative position between cover (1) and supporting plate (3).

The central line inside the supporting plate (3) is constantly directed in a longitudinal direction, the width of strip film (A) and the second guide (40) are about the same so that strip film (A) lightly passes through second guide (40), and two end cutting are formed on each side of second guide (40).

When press plate (2) is fixed by cover (1), and together with supporting plate (3), first opening (11) of cover (1) and an inside part of second opening (12) are on a same horizontal [plate] plane with second guide (40).

Figure 2:
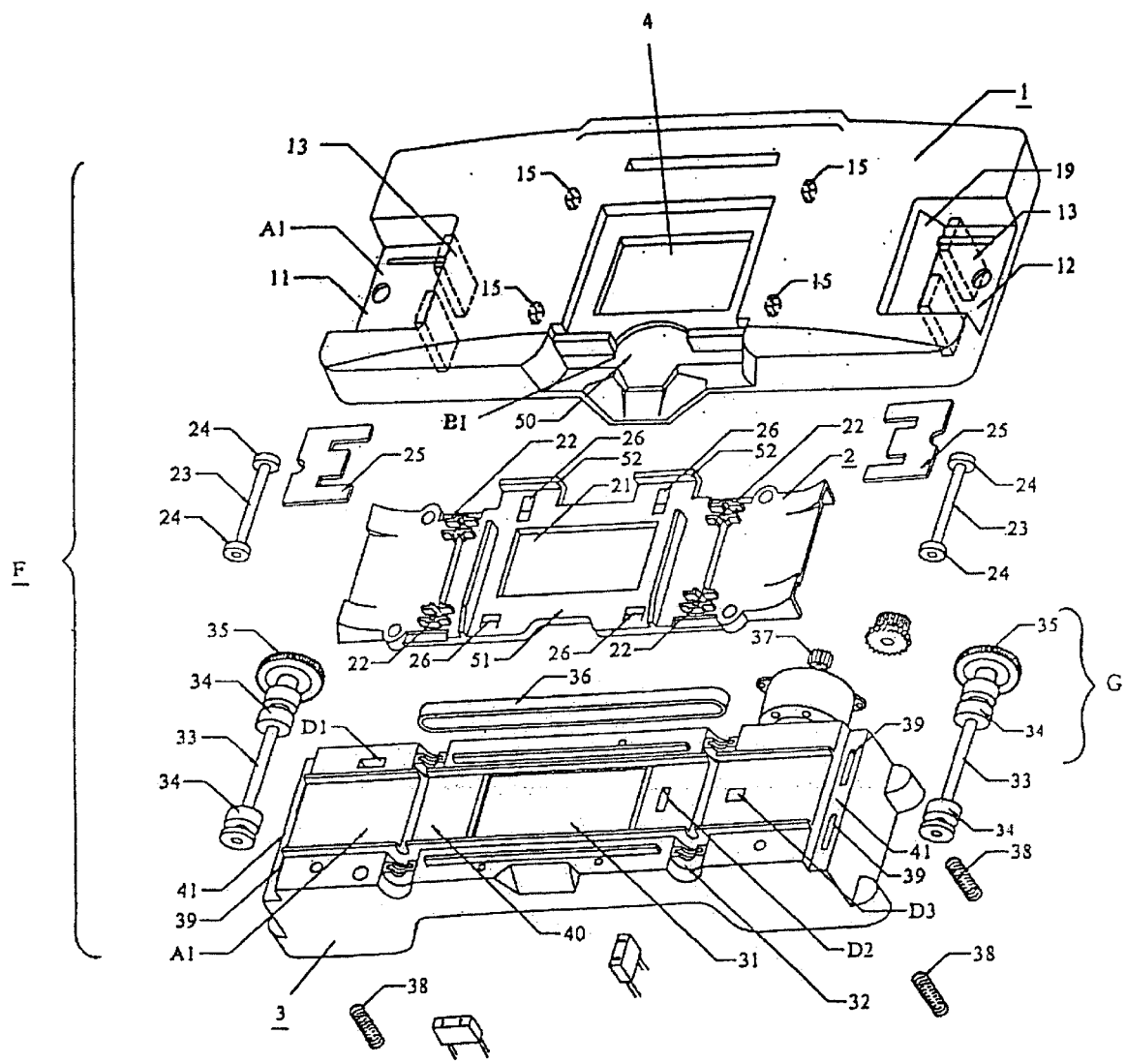
FIG. 2 is an exploded view of a cover, a press plate and a supporting plate.
Figure 3:
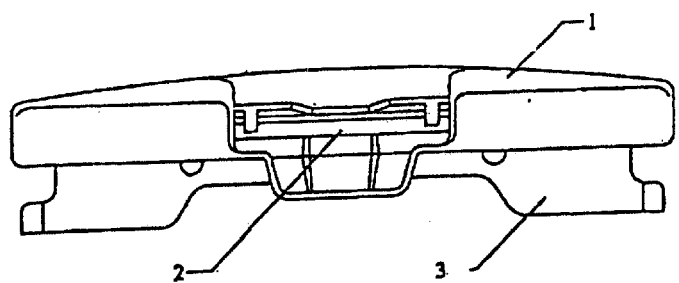
FIG. 3 is a front elevational view of a scanning device.
Figure 4:
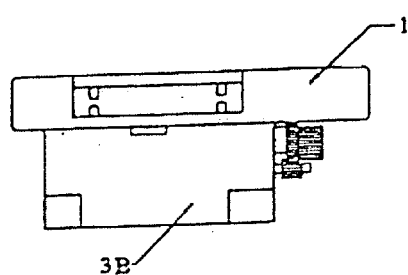
FIG. 4 is a side view of FIG. 3.
Figure 5:
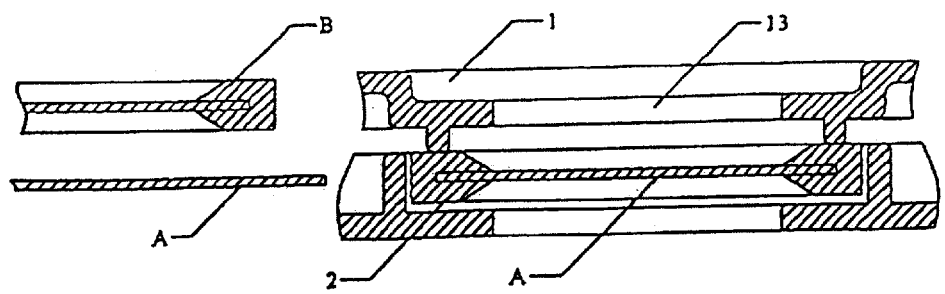
FIG. 5 is a section view showing the insertion of a slide mount between the cover and the press plate.
Figure 6:
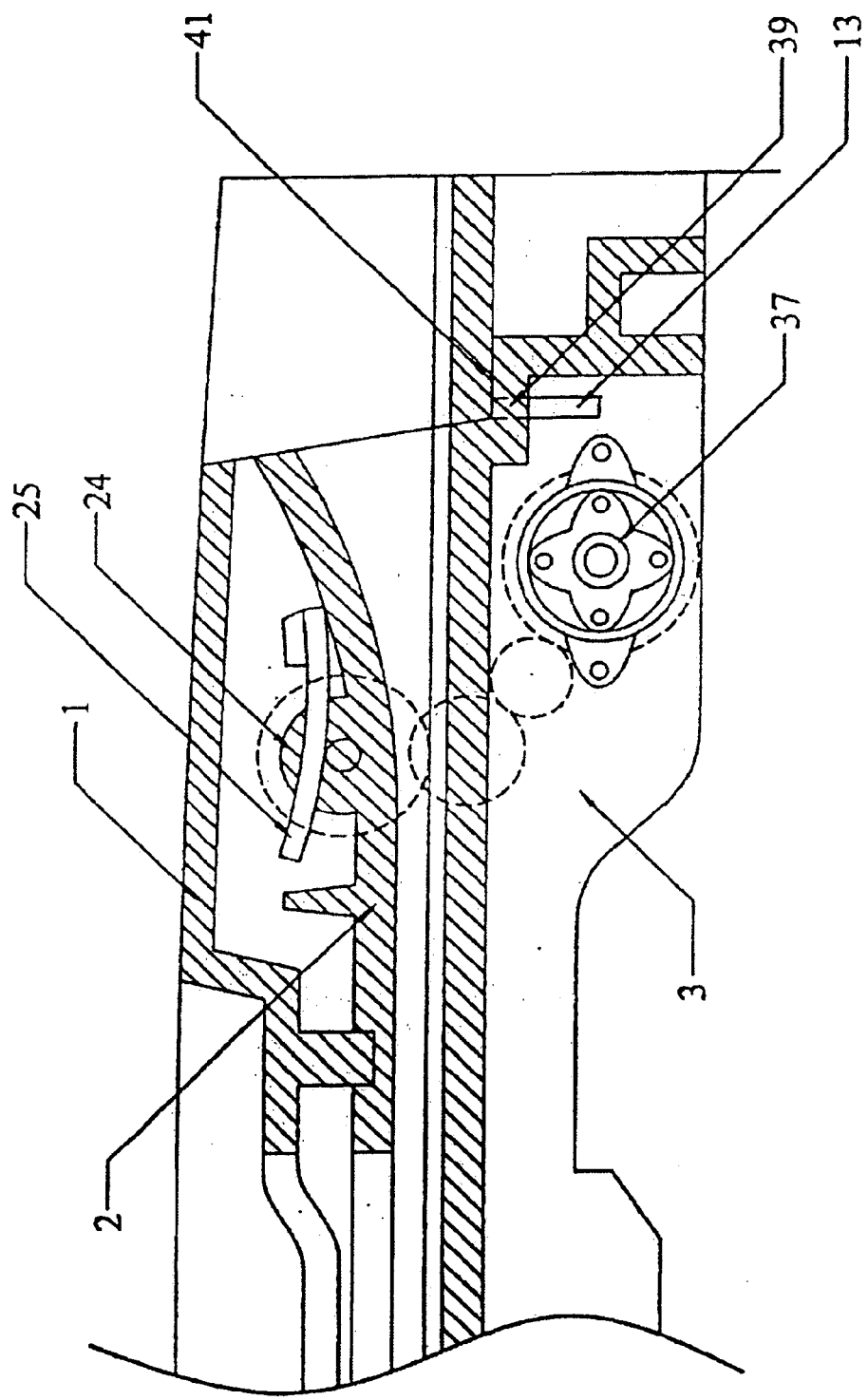
FIG. 6 is a partial sectional view of the cover and supporting plate and the three layers of cover, press plate and the supporting plate.

D1 in FIG. 2 detects the presence of strip film (A), through a sensor which determines the position of the strip film. The layout of the aforesaid sensor in the present example is such that the insertion of strip film (A) is detected by the sensor in the entrance side. (D2) is a sensor which detects the location of strip film (A). (D3) is a sensor which detects the motion of the end of strip film (A).

The inserting system (B1) for the slide mount is similar to the strip film inserting system (A2), therefore, the name and symbol of the components of the strip film system (A2) are used again hereinafter.

Reference 50 in FIG. 2 refers to the third opening for slide mounts, and is located in a central portion of cover (1). Strip film (A) is carried through the longitudinal direction of cover (1) and slide mount (B) is inserted in a direction that is perpendicular to that longitudinal direction.

The width of opening (50) is about the width of slide mount (B), a first guide which guides the slide mount to press plate (2) is located between an inside surface and press plate (2).

With reference again to FIG. 2 a stop slice (52) of press plate (2) lugged upward in the back of third opening 50 is used to confirm that the insertion is complete. When slide mount (B) is inserted into first guide (51), the end of slide mount (B) is in contact with stop slice (52).

The components of scanning system (C) are not very different from the device that is used so far, and it is shown in FIG. 1. A projective light (62) is located beneath the end of a photographic sensor or picture sensor (60) which is located in the direction that slide mount (B) is inserted into cover (1). Picture sensor (60) is mobile with a back and forth motion, light (62) and scanner (63) are located beneath strip film (A) and slide mount (B) when scanning.

Scanning Operation of Strip Film (A)

In use, to scan a strip film (A), a first end of strip film (A) is inserted into first opening (11) of cover (1). The first end of strip film (A) is moved in via a carrying path (42) of supporting plate (3) and the inside surface of press plate (3) from the first opening (11), and the insertion of said strip film (A) is detected by the entrance sensor (DI) of carrying path (42).

A signal of entrance sensor (D1) makes that motor (37) of the carrying mechanism (G) starts to turn and its rotating force is transmitted through the timing belt (36) to shafts (33) and to actuating rollers (34). Consequently, strip film (A) is moved to the exit between rollers (34) and idling rollers (24) of press plate (2).

The carrying is stopped by a signal of location sensor (D2) when strip film (A) is correctly positioned, i.e. when strip film (A) is aligned with first light path (4) of cover (1), second light path (21) of press plate (2) and third light path (31).

The scanning is conducted when the position of strip film (A) is in alignment with the two light paths (21), (31), thereby allowing the light from the light source (62) to be transmitted through light paths (21) and (31) and strip film (A).

When the scanning of the frames of the whole strip film (A) is over, exit sensor (D3) located in supporting plate (3) detects the end of strip film (A), the detection signal from the end of strip film (A) is transmitted to motor (37), and the scanning of strip film (A) is over when motor (37) stops working.

The carrying mechanism of strip film (A) is located at the second guide in the movable side and unified into one body. The first guide is located on the way from the photographic sensor (60) of the picture of stripfilm (A) or slid mount (B) to the light path. The distance to the scanner (63) of the photographic sensor (60) is minimized, thereby keeping the size of the body of the device small.

Scanning Operation of a Slide Mount

Slide mount (B) is in contact with first guide (51) in third opening (50).

As for the insertion of slide mount (B), a view from an upper part of first opening (11) of cover (1) allows to judge the existence and the right position of the insertion, therefore, a dedicated sensor is not really necessary, but would of course improve the invention.

The scanning starts automatically when slide mount (B) is carried to a location aligned with the position of the two light paths (21) and (31). The scanning can also be operated manually after it has started.

Effect

Neither the strip film nor the slide mount need a special scanner device. The scanning is triggered by the insertion of a photographic medium into the first or the second opening.

The same photographic sensor is used for scanning even though the thickness of the strip film and the thickness of the slide mount are different thereby keeping the whole body of the present invention small.

It is possible to insert a first end of the strip film in the aperture manually. Then the carrying is automatic so it is easy to use. Also it is possible to reverse the motion of the film when the end of the film has passed the aperture position, so it is very easy to take back the film. A situation of uneven carrying of the film never happens, so the carrying of the film is smooth.

A timing belt (36) is used in the preferred embodiment of the present invention. However, this should not be considered as a restriction in the present application. Timing belt (36) is replaceable by any device that can achieve the same purpose.

What is claimed is:

1. A film scanning device comprises:

a body having a strip film transport path disposed there through, the transport path having a first opening in the body for inserting a developed strip film, and a second opening in the body through which the developed strip film inserted into the first opening exits the body;

a third opening is disposed in the body for inserting and pulling out a slide mount, the third opening being juxtaposed vertically relative to the strip film transport path;

an actuator is located at each of two sides of the body proximate the first and second openings, respectively, that actuates an actuating mechanism that moves the strip film through the transport path;

a photographic sensor that takes pictures of the strip film inserted in the first opening and/or the slide mount inserted in the third opening; and a projection light that projects the pictures from the photographic sensor.

2. The film scanning device as claimed in claim 1, wherein there is at least one location having a transit roller to transit the strip film in the actuating mechanism, the transit roller being located upstream or downstream of a direction of travel of the strip film in the transport path relative to the photographic sensor.

3. The film scanning device as claimed in claim 2, wherein an upstream transit roller and a downstream transit roller are coupled by link mechanisms that are actuated by a same timing belt or gear that moves with a given period.

* * * * *